March 31, 1931.   F. KODAMA   1,798,543
SHELLER
Filed Dec. 29, 1928    4 Sheets-Sheet 1
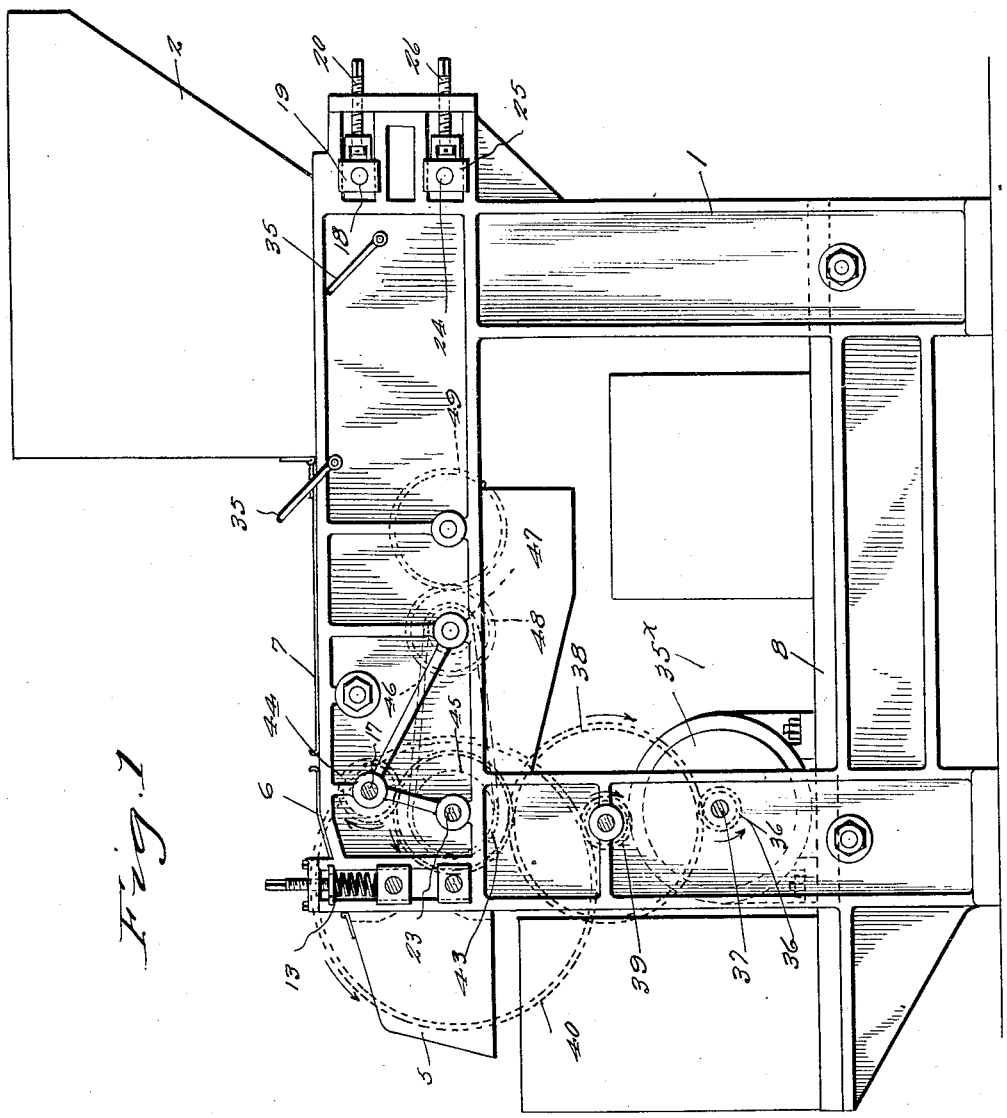
Inventor
*Frank Kodama*
By *Clarence A O'Brien*
Attorney

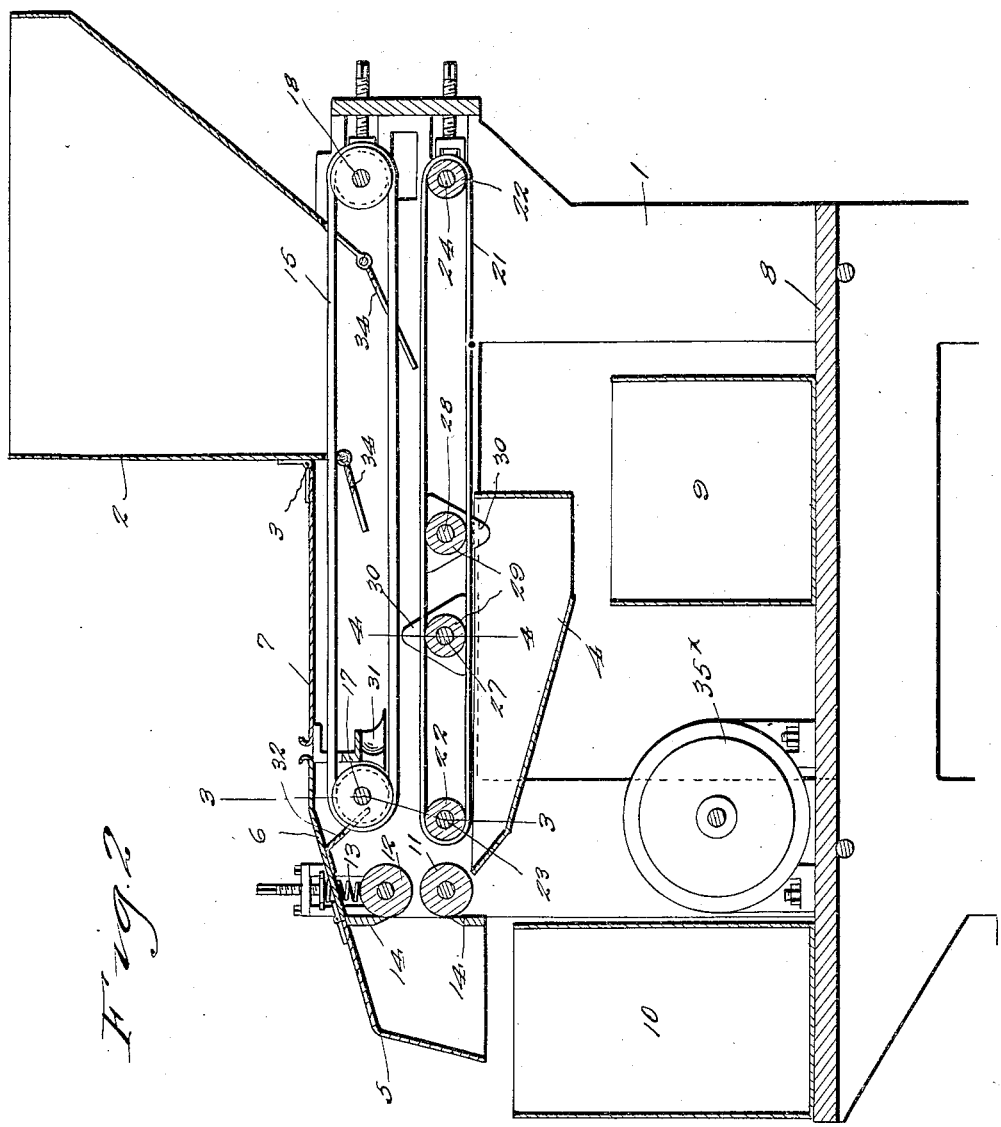

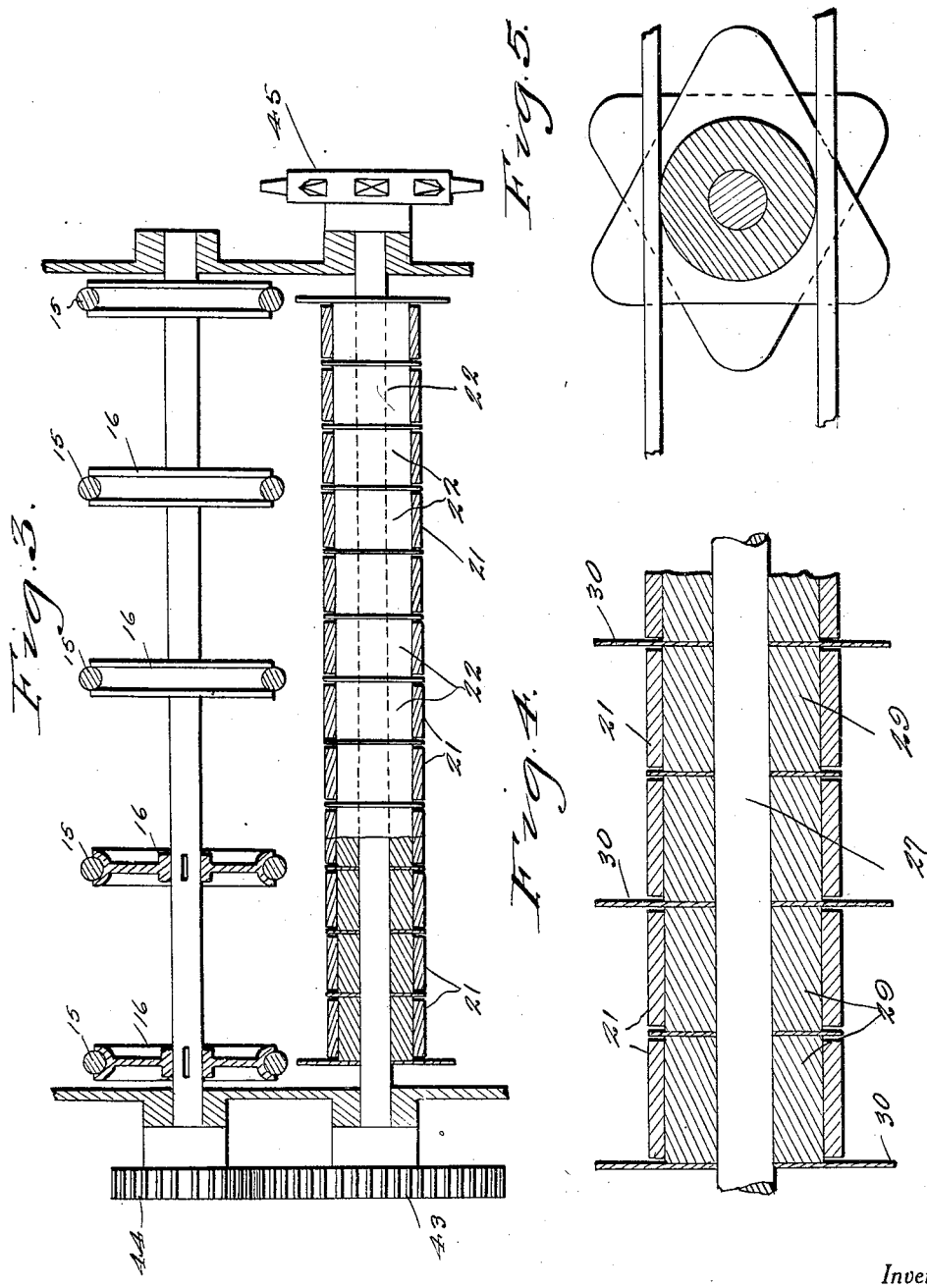

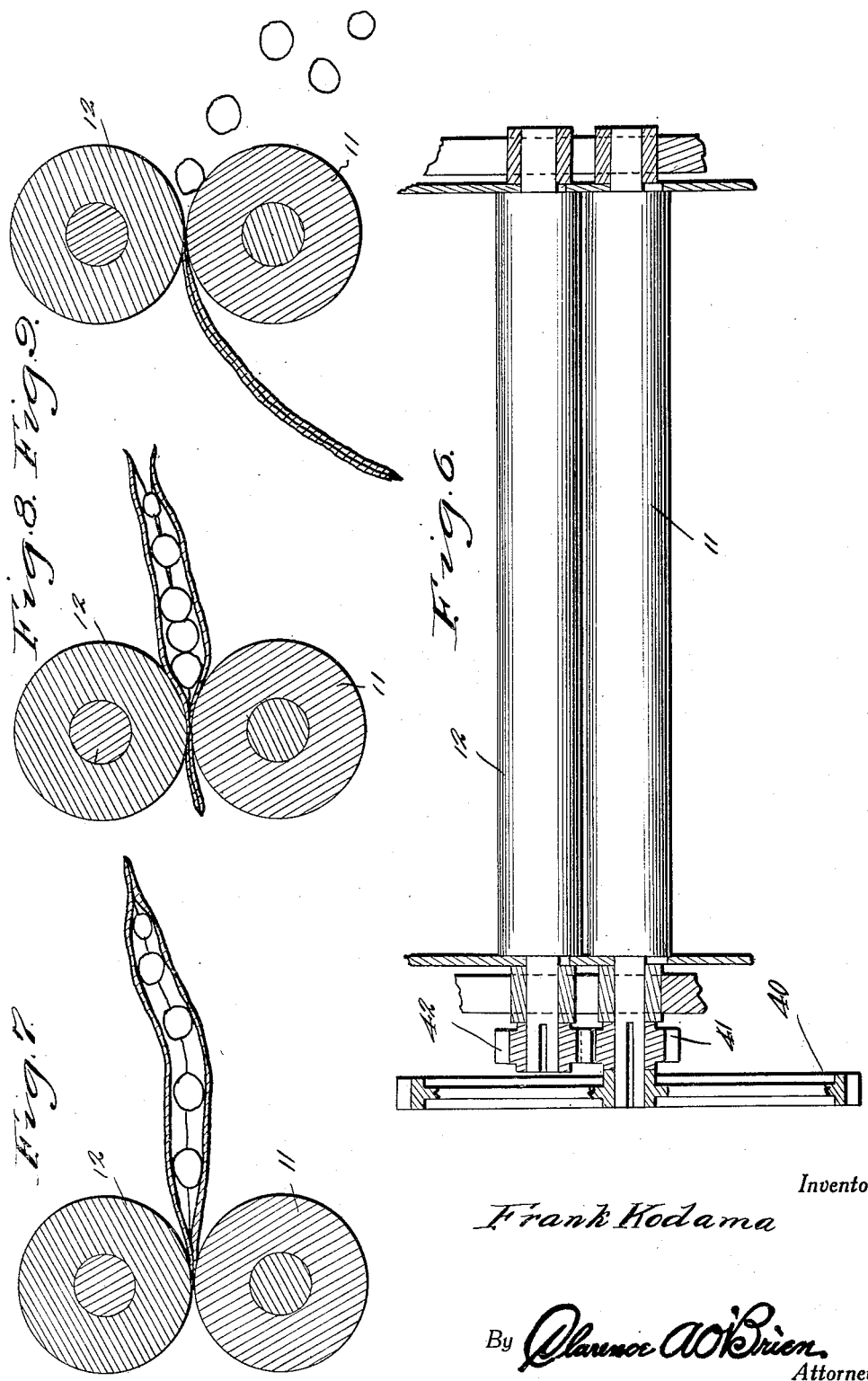

Patented Mar. 31, 1931

1,798,543

UNITED STATES PATENT OFFICE

FRANK KODAMA, OF NEW YORK, N. Y.

SHELLER

Application filed December 29, 1928. Serial No. 329,169.

The object of my said invention is the provision of improved and highly efficient means for shelling peas and other leguminous crops, the term peas as herein employed being intended to comprehend beans and all other shell contained products for the shelling and hulling of which my novel means is adapted.

To the attainment of the foregoing, the invention consists in the improvement as hereinafter described and definitely claimed.

In the accompanying drawings forming part of this specification:

Figure 1 is a side elevation of the means or apparatus constituting the preferred embodiment of my invention.

Figure 2 is a longitudinal vertical section of the same.

Figure 3 is an enlarged fragmentary transverse section, partly in elevation, the sectional part being taken on the line 3—3 of Figure 2.

Figure 4 is a fragmentary enlarged transverse section taken on the line 4—4 of Figure 2.

Figure 5 is a detail enlarged section taken on the plane indicated by the line 5—5 of Figure 4, looking toward the left.

Figure 6 is an enlarged detail view taken at right angles to Figure 1 and showing the shelling rolls of my improvement and the appurtenances of said rolls.

Figures 7, 8 and 9 are enlarged views, diagrammatic in character and illustrating the manner in which the rolls referred to operate to bring about the separation of peas and the like from the containing shell.

Similar numerals of reference designate corresponding parts in all the views of the drawings.

The frame 1 of the illustrated apparatus may be of the construction shown or of any appropriate construction without affecting my invention. Said main frame 1 is equipped with a hopper 2, preferably connected in hinged manner at 3; and it is also equipped with a chute 4 for peas and with a spout 5, the latter for deflecting shells downwardly. At 6 and 7 the frame 1 is preferably, though not necessarily, equipped with hingedly connected lids which may be raised whenever it is deemed necessary to inspect the operation of the organized shelling mechanism.

Placed on a platform 8 comprised in the main frame 1 is a receptacle 9 for the reception of peas, and a receptacle 10 for the reception of shells, both receptacles being designed to be quickly and easily removed and as readily replaced.

Mounted in suitable bearings in the main frame 1 and arranged one above the other and back of the spout 5 are transverse rolls 11 and 12 which constitute important features of my novel means. In this connection I would have it understood that my invention contemplates the endwise moving of the shells or pods of peas between rolls such as 11 and 12, the rolls revolving in opposite directions so that the shells will be squeezed while the peas will be caused to slip along inside the shells and crowded toward the rear ends of the shells. Synchronously with the operation described, air contained in the shell will be gradually compressed toward the rear ends of the shells as the shells progress between the rolls, and also incident to the squeezing of the shells, the same will be flattened and due to the described change of form of the shell increasing structural stresses will be set up in the fiber structure of the shell with the result that three forces will operate to burst the shells and one or more of said forces will during the passage of the shells between the rolls 11 and 12 bring about bursting of the shells in most instances at the rear thereof and release the peas from the shells, so that while the peas will drop back of the rolls 11 and 12, the shells will be fed entirely between the rolls and will drop therefrom through the spout 5 into the receptacle 10.

In the present and preferred embodiment of my invention, the bearings of the upper roll 12 are subject to the action of spring means 13 so that the said upper roll 12 will be yieldingly held to its work.

Carried by the main frame 1 and fixed with respect thereto are scrapers 14, the sharpened edges of which are presented to the rolls 12 and 11. The said scrapers 14 as their name imports are designed to remove any shell particles that may adhere to the perimeters of the rolls 11 and 12 and assure such particles dropping in the receptacle 10, so that at all times the perimeters of the rolls 11 and 12 will be maintained in a clean state.

Arranged in the upper portion of the main frame 1 are longitudinal belts 15, preferably of circular cross section, Figure 3. The said belts 15 are spaced apart in parallelism and are mounted on circumferentially grooved wheels 16, the said wheels being carried by shafts 17 and 18. The shaft 18 is preferably mounted in adjustable bearings 19 subject to adjustment means 20 so that when occassion demands slack of the belts 15 may be readily taken up. Disposed below the belts 15 and spaced from the lower stretches thereof are belts 21, Figures 1 and 2, and 3. The said belts 21 are mounted on spools 22, and the spools 22 adjacent the rolls 11 and 12 are fixed on a shaft 23 designed to be driven as hereinafter described.

The spools 22 remote from the rolls 11 and 12 may be either loose on or fixed to their respective shaft 24, in the discretion of the manufacturer, and I would also have it understood that by preference the shaft 24 is mounted in movable bearings 25 subject to adjustment means 26 so that slack of the belts 21 may be taken up whenever the same is necessary.

The belts 21 are preferably of flat strap form, Figure 3, and are preferably relatively arranged as shown in said Figure 3 to the belts 15.

Located in the main frame 1 at points between the shafts 23 and 24 are shafts 27 and 28 on which are loosely mounted pulleys 29 disposed between and in engagement with the stretches of the belts 21 as best shown in Figure 4.

Fixed to the shafts 27 and 28 and arranged between the pulleys 29 are agitator discs 30. The discs 30 on the shaft 27 are preferably arranged reversely to the discs 30 complementary to the shaft 29, Figure 2, and I would also have it understood that when deemed expedient the discs 30 on either or both of the shafts 27 and 28 may be arranged as shown in Figures 4 and 5—i. e., the alternate discs of a shaft may be arranged out of coincidence with the adjacent discs 30 on said shafts as will be readily understood by reference to Figures 4 and 5 and comparison thereof.

The discs 30 are arranged to work between the belts 21, and the purpose of the said discs 30 is to work or agitate the shells so that the said discs 30 will cooperate with the belts 21 and 15 in promoting the arrangement of the shells longitudinally of the apparatus and the presentation of the same in proper position to the aforementioned rolls 11 and 12.

In the above connection it will be understood that the shells or pods will drop from the hopper 2 between the belts 15 and will light upon and be conveyed by the upper stretches of the belts 21 toward the rolls 11 and 12, and it will also be appreciated that the belts 15 will not only open the mass of peas during the gravitation of the mass, but the lower stretches of the belts 15 will assist in a measure in the positive feed or conveyance of the pods toward the rolls 11 and 12.

Carried by the main frame 1 and disposed immediately back of the circumferentially grooved pulleys 16 adjacent to the rolls 11 and 12 are spaced deflectors 31, designed and adapted to prevent pods from passing at the sides of the said pulleys 16. It will also be noticed that the lid 6 is equipped with a toothed deflector 32, the tangs of which rest at opposite sides of and close to the pulleys 16 so as to prevent pods from moving upwardly with the belts 15, as the same pass around the pulleys 16.

In order to enable an attendant to control the passage of pods from the hopper 2 and to practically cut off the fall of pods from said hopper 2 when deemed expedient I provide the toothed gates 34, Figure 2, which are mounted in the main frame 1 and are fixed with respect to handles 35, Figure 1. By manipulating the said handles 35 the said gates 34 may be opened or closed at the will of an attendant, and it will be understood that the toothed form of the gates 34 is resorted to in order to enable the lower stretches of the belts 15 to freely pass through said gates 34.

Any desirable and appropriate means may be employed for actuating the working parts of my improvement without affecting my invention. I prefer, however, to employ an electric motor 35$x$ mounted in the main frame 1, and having a spur gear 36 fixed to its armature shaft 37. The said gear 36 is meshed with a gear 38, fixed with respect to a smaller gear 39, Figure 1, and the said gear 39 is meshed with a spur gear 40 on the lower roll 11, and it will be noted from Figure 6 that motion is transmitted from the lower roll 11 to the upper roll 12 through the medium of meshed gears 41 and 42 fixed with respect to said rolls. It will be apparent from this that incident to the operation of the apparatus the roll 11 will be rotated in anti-clockwise direction, while the roll 12 will be rotated in clockwise direction.

It will be gathered from Figure 1 that the spur gear 38 is meshed with a spur gear 43 fixed to the shaft 23 for the driving of the belts 21, and that the said spur gear 43, in turn, is meshed with a spur gear 44 on the shaft 17 for the driving of the belts 15.

Also fixed on the shaft 23 is a sprocket gear 45 which is connected by sprocket belts 46 with a sprocket gear 47 on the shaft 27 for the rotation of the discs 30 nearest the rolls 11 and 12. The said shaft 27 is further equipped with a spur gear 48, and said spur gear 48 is meshed with a larger spur gear 49 fixed on the shaft 28. From this it follows that the discs 30 comparatively remote from the rolls 11 and 12 will be rotated reversely to and slower than the discs 30 that are nearest to the rolls 11 and 12. This difference in speed of the two sets of discs 30 is preferable because it assists in the disposition of the pods lengthwise of the apparatus.

In the practical operation of the illustrated apparatus it will be understood that the pods dropping from the hopper 2 will be conveyed toward the rolls 11 and 12, and incident to such conveyance the pods will be disposed lengthwise of the apparatus so that the pods will be fed lengthwise across the gaps between the belts, on the one hand, and the rolls 11 and 12, on the other, and as the pods pass between the rolls 11 and 12 as shown in Figures 7 and 8 and 9, as hereinbefore specifically described, the shells will be broken, and the peas expelled from the shells with the result that the peas will be deposited in the receptable 9 and the shells in the receptacle 10 all in one continuing operation.

It will be apparent from the foregoing that my novel apparatus will require little attention from attendants whose only province will be to see that the hopper 2 is kept charged with pods unless, of course, some means, not illustrated, is employed for automatically feeding the pods to the hopper 2.

I have entered into a detailed description of the construction and relative arrangement of the elements embraced in the present and preferred embodiment of my invention in order to impart a full, clear, and exact understanding of the said embodiment.

I do not, however, desire to be understood as limiting myself to the specific construction disclosed, my invention being defined by my appended claims within the scope of which modifications may be made without departure from the principle of my invention.

Having thus described the invention, what I claim as new and desire to secure by Letters Patent is:—

1. In a sheller, the combination of means for receiving a mass of pods and conveying the same lengthwise, and upper longitudinal belts spaced transversely apart and arranged with their lower stretches above the upper stretch of said conveying means, and oppositely revolving rolls between which the pods are fed lengthwise by said conveying means, said rolls operating to squeeze the pods or shells, compress air therein and flatten the pods or shells, whereby the pods or shells are bursted back of the rolls and peas are separated from the pods or shells, at said points, and the pods or shells free of peas are discharged from the rolls in advance of the same.

2. In a sheller, the combination of means for receiving a mass of pods and conveying the same lengthwise, said means including lower strap like belts arranged side by side, and upper longitudinal belts spaced transversely apart and arranged with their lower stretches spaced above the upper stretches of the first named belts, means for agitating and assisting in the lengthwise arrangement of the pods incident to said conveyance thereof, said agitating and positioning means being formed by revoluble discs arranged between the first named belts and protruding upwardly beyond the upper stretches thereof, and oppositely revolving rolls spaced from said groups of belts and between which the pods are fed lengthwise; said rolls operating to squeeze the pods or shells, compressed air therein, and flatten the pods or shells, whereby the pods or shells are bursted back of the rolls and peas are separated from the pods or shells at said point, and the pods or shells free of peas are discharged from the rolls in advance of the same.

3. In a sheller and in combination, means for receiving a mass of pods and conveying the same lengthwise, said means comprising lower strap like belts arranged side by side and upper longitudinal, transversely spaced belts arranged with their lower stretches spaced above the upper stretches of the first named belts, the second named belts of circular cross section, rolls spaced from said belts, pulleys complementary to the second named belts and arranged adjacent said rolls, deflectors complementary to and arranged back of said pulleys and between the upper and lower stretches of the second named belts, and means for agitating and assisting in the lengthwise arrangement of the pods incident to the conveyance of the pods toward the rolls.

4. In a sheller and in combination, means for receiving a mass of pods and conveying the same lengthwise, said means comprising lower strap like belts arranged side by side and upper longitudinal, transversely spaced belts arranged with their lower stretches spaced above the upper stretches of the first named belts, the second named belts of circular cross section, rolls spaced from said belts, pulleys complementary to the second named belts and arranged adjacent said rolls, deflectors complementary to and arranged back of said pulleys and between the upper and lower stretches of the second named belts, means for agitating and assisting in the lengthwise arrangement of the pods incident to the conveyance of the pods toward the rolls; said agitating and positioning means being formed by discs revoluble between stretches of the first named belt.

5. A sheller comprising a main frame, a hopper thereon, transverse rolls, scrapers complementary to said rolls, a lower series of longitudinal strap-like belts arranged side by side, an upper series of transversely spaced longitudinal belts of circular cross section extending under the hopper and arranged with their lower stretches spaced above the upper stretches of the first named belts, and one or more transverse series of spaced discs revoluble between the first named belts and adapted to agitate the pods and to assist in the positioning of the pods lengthwise of the apparatus; the said hopper being equipped with manually controlled gate means constructed and arranged to avoid interference with the second named belts.

6. In a sheller, the combination of a hopper, means extending below the hopper for receiving a mass of pods and conveying the same lengthwise, oppositely revolving rolls between which the pods are fed lengthwise by said conveying means, and longitudinal, transversely spaced belts below the hopper and above the conveying means for agitating and assisting in the lengthwise arrangement of the pods incident to said conveyance thereof; said rolls operating to squeeze the pods or shells, compress air therein, and flatten the pods or shells, whereby the pods or shells are bursted back of the rolls and peas are separated from the pods or shells at said point, and the pods or shells free of peas are discharged from the rolls in advance of the same.

In testimony whereof I affix my signature.

FRANK KODAMA.